United States Patent [19]
Schneider et al.

[11] 4,353,272
[45] Oct. 12, 1982

[54] APPARATUS FOR CONTROLLING THE OPERATION OF THE ENGINE-TRANSMISSION ASSEMBLY OF A MOTOR VEHICLE

[75] Inventors: Erich Schneider, Kirchheim; Helmut Fleischer, Schwieberdingen; Helmut Rembold, Stuttgart; Alexander Witte, Gerlingen, all of Fed. Rep. of Germany

[73] Assignee: Robert Bosch GmbH, Stuttgart, Fed. Rep. of Germany

[21] Appl. No.: 185,914

[22] PCT Filed: Dec. 7, 1978

[86] PCT No.: PCT/EP78/00026

§ 371 Date: Nov. 17, 1979

§ 102(e) Date: Nov. 5, 1979

[87] PCT Pub. No.: WO79/00781

PCT Pub. Date: Oct. 18, 1979

[30] Foreign Application Priority Data

Mar. 17, 1978 [DE] Fed. Rep. of Germany ....... 2811574

[51] Int. Cl.³ .................... B60K 41/00; B60K 41/06
[52] U.S. Cl. ...................................... 74/859; 74/857; 74/860; 74/866; 74/872
[58] Field of Search ................. 74/866, 843, 856, 857, 74/859, 860, 861, 872

[56] References Cited

U.S. PATENT DOCUMENTS

| | | | |
|---|---|---|---|
| 3,324,740 | 6/1967 | Lewis et al. | 74/472 |
| 3,579,978 | 5/1971 | Stoms | 60/19 |
| 3,579,979 | 5/1971 | Bosch | 60/19 |
| 3,680,410 | 8/1972 | Sumiyoshi et al. | 74/866 |
| 3,693,479 | 9/1972 | Toyoda et al. | 74/866 X |
| 3,890,360 | 6/1975 | Pruvot et al. | 74/866 X |
| 3,927,528 | 12/1975 | van der Kork et al. | 74/859 X |
| 3,937,105 | 2/1976 | Arai et al. | 74/866 |
| 3,939,738 | 2/1976 | Adey et al. | 74/861 |
| 4,008,567 | 2/1977 | Hirsch | 74/866 |
| 4,038,889 | 8/1977 | Lindow et al. | 74/866 |
| 4,044,634 | 8/1977 | Florus et al. | 74/866 |
| 4,165,722 | 8/1979 | Aoyama | 74/860 X |

FOREIGN PATENT DOCUMENTS

| | | |
|---|---|---|
| 2108987 | 9/1972 | Fed. Rep. of Germany . |
| 2712327 | 6/1977 | Fed. Rep. of Germany . |
| 2625770 | 12/1977 | Fed. Rep. of Germany ........ 74/861 |
| 2720950 | 11/1978 | Fed. Rep. of Germany . |

*Primary Examiner*—Leslie Braun
*Attorney, Agent, or Firm*—Frishauf, Holtz, Goodman & Woodward

[57] ABSTRACT

The engine is controlled by sensing fuel pedal position, indicative of desire engine power. A characteristic transmission data field is used to select the appropriate gear or gear ratio. The engine is controlled on the basis of characteristic engine data or on the basis of an engine operating curve associated with minimum fuel consumption in dependence of the changes in engine speed due to the changing transmission ratio. In normal driving, the apparatus selects operation along the minimum fuel curve whereas during periods of increased power demand, the apparatus operates in dependence of characteristic engine data. Also proposed is apparatus which takes account of the operational vehicle status and effects the switchover from optimum fuel consumption to optimum power delivery with priority assigned to optimum fuel economy.

22 Claims, 25 Drawing Figures

APPARATUS FOR CONTROLLING THE OPERATION OF THE ENGINE-TRANSMISSION ASSEMBLY OF A MOTOR VEHICLE

STATE OF THE ART AND BACKGROUND

The invention relates to an apparatus for controlling an engine/transmission unit of a motor vehicle. The apparatus includes an operating member for setting a power setpoint and a data storage which contains characteristic power curves of the engine.

In order to obtain predetermined operational behavior of engine—transmission assemblies also known as the drive train or power train of a vehicle, especially the combination of diesel engines and stepless, hydrostatic transmissions used in heavy-duty trucks, it is known to perform a simultaneous control of the operation of the engine and the stepless transmission.

The British Pat. No. 1,258,591 describes a control unit for an adjustable hydrostatic transmission powered by an internal combustion engine which employs as its control element a three-dimensional cam having three spatially curved control surfaces, each of which is followed by a sensor. The sensors engage suitable actuators which control the fuel supply of the internal combustion engine and the displacement of a hydrostatic pump and motor. The cam is movable axially and in rotation, one of these motions being caused by a control lever while the other is performed by an actuator controlled by the high pressure in the hydrostatic transmission. The control process is thus a mechanical one, rather than an electronic one, and it is difficult and expensive to produce the control surfaces of the three-dimensional cam with an exactness which meets the demands for control precision. The continuous mechanical contact of the sensors with the control surfaces also results in rapid wear of the cam.

U.S. Pat. No. 3,324,740 describes a further control apparatus in which the driver's actuation of the gas pedal sets the transmission ratio of the transmission as well as the speed (rpm) of the engine. A first control unit maintains the desired engine speed by positioning the throttle valve while a second control unit adjusts the transmission ratio. A further control unit is provided to prevent stalling of the engine by adjustment of the transmission ratio when the drive shaft is overloaded for a given transmission ratio. The latter control unit also adjusts the transmission ratio when the engine speed becomes excessively high. However, the further control unit becomes effective only if the desired engine speed cannot be maintained by the associated actuator, whereas, in normal operation, the transmission ratio and the engine speed is selected by the driver, the speed being set in conventional fashion by means of the carburetor setting.

The German Patent Disclosure Document DE OS 2 340 841 describes an apparatus for the common control of a drive motor and a stepless hydrostatic transmission on the basis of the command value for the output torque and of the instantaneous engine speed derived from the aspiration rate and the operational pressure. A tachogenerator monitors the engine speed and its signal serves for shifting the null point during the application of the instantaneous speed signal to a control unit which generates the control signal for the inclined planes of the hydrostatic transmission.

It is a common disadvantage of the aforementioned apparatuses that they do not, or only approximately, make use of the operational engine data for obtaining minimum fuel consumption and thus cannot guarantee operation of the vehicle with optimized consumption and correspondingly low toxic emission.

The German Patent Disclosure Document DE OS 2 712 327 further describes a method for the automatic control of motor vehicles in which the throttle valve in the carburetor of the drive motor is controlled in dependence on the position of the gas pedal, via a first characteristic data memory. A second characteristic data memory is used to derive a nominal engine speed value from the gas pedal position; this value is compared with the actual engine speed value and the difference is applied to a servo-mechanism for adjusting the stepless transmission. One disadvantage of this method is the fact that the control of the throttle valve is superimposed on the transmission control, i.e., the correcting variable for the transmission follows the changes in engine speed due to the changes in throttle valve position. Due to the fact that the throttle valve control operates substantially faster than the transmission control, there occurs a hysteresis effect between the two control processes, preventing the operation of the drive motor along the characteristic curve for minimum fuel consumption.

Finally, the German published patent application DE AS 2 328 112 describes a controller for regulating the fuel consumption and the transmission ratio for the drive means of a motor vehicle in which the gas pedal sets a nominal engine speed value which is compared with the actual engine speed value and the difference is used to control magnetic valves which change the effective transmission ratio of the stepless transmission. At the same time, the difference of the engine speed values is used to control a magnetic valve which sets the position of the throttle valve along a given characteristic curve. This apparatus shares the disadvantage of only incompletely making use of the optimum operational vehicle conditions necessary for minimum fuel consumption. Furthermore, it is a common disadvantage of all of the known systems to make possible at best operation at approximately favorable fuel consumption but not to provide the possibility for obtaining the full output power of the motor vehicle when required. Inasmuch as the controlled operation of a motor-transmission unit under conditions of optimized fuel consumption necessarily entails the possibility of a speed reduction for certain load changes, dangerous situations may arise, for example during passing, when the driver depends on the availability of high power from the engine.

THE INVENTION

It is a principal object of the present invention to provide an apparatus for controling the operation of an engine/transmission unit in a motor vehicle on the basis of stored engine data and a power setpoint with minimum energy consumption.

Briefly, the apparatus of the invention includes a first control loop in which characteristic transmission data are used to set a transmission ratio (i) correlated with the power setpoint and the vehicle speed and a second control loop in which characteristic engine data are used to set an engine control variable ($\alpha$) correlated with engine power and engine speed.

The apparatus according to the present invention presents the advantage of performing the control of the drive motor and of the transmission by means of suitably attuned characteristic data fields or data curves and by assigning priority to the control loop for the transmission ratio over that for the engine control. Inasmuch as the engine control loop functions much more rapidly than does the transmission control loop, the entire drive motor/transmission assembly may be operated along the characteristic curve of the drive motor which designates optimum fuel consumption.

The methods described in the dependent claims permit advantageous developments in the apparatus described in the main claim.

The position of the gas pedal defines the power setpoint of the engine. The signal related to gas pedal position is modified according to a quasi-parabolic curve which is derived from the drive resistance parabola of the motor vehicle. In this way, pedal motions result in relatively small power changes at low output power which insures smooth driving at low speeds (low power).

The construction of the apparatus of the invention permits it to be used for stepless drives as well as those having discrete step transmissions. The apparatus provides that a characteristic data field defines the transmission ratio of a stepless transmission or the discrete gear of a gear-type transmission, in dependence on the pre-selected power value setpoint and the prevailing transmission output speed which corresponds to a given vehicle speed.

The engine is controlled on the basis of data contained in a characteristic engine data memory which contains the engine data field defining the output power as a function of engine speed and throttle valve position or contains the characteristic operating curve related to optimum fuel consumption of the engine. On the basis of these data, the vehicle may be operated at optimum power or at optimum fuel consumption.

The memories for storing the characteristic data fields may suitably be digital memories which are obtainable in commerce as inexpensive, mass-produced devices. These devices permit simple storage and readout of the characteristic data fields and/or curves, especially when embodied as Read-only memories (ROM's) in which the various data fields are quantized and the individual quantized data segments are stored at the various addresses of the digital memories. These memories are interrogated by the addition of input values which defines a data address within the memory. Simple additional circuitry makes it possible to take into account the ambiguous association of input values to the output data within the hysteresis zone of a gear selection scheme of a discrete transmission.

The invention provides for a program control unit which makes possible the switch-over from an operation at optimum fuel consumption to an operation yielding the full available power when required, as may be done in conventional engine/transmission units. The program control unit takes into consideration the operational conditions which occur in actual service. For example, in a first exemplary embodiment of the program control unit, the unit becomes active only if the rate of the gas pedal movement exceeds a pre-determined limit, i.e. when the driver operates the gas pedal abruptly or very rapidly. A second embodiment of the program control unit is actuated only when the selected power setpoint deviates more than a given amount from the prevailing output power, i.e., when the driver demands an excessive increase of power.

A third embodiment of the program control unit becomes active when the power setpoint value selected by the gas pedal position is not actually attained within a given period of time. On the other hand, the control unit switches back from operation at optimum (maximum) power to optimum (minimum) fuel consumption when the actual engine speed has reached the value corresponding to the power setpoint. In this way, after each change of the power setpoint and switchover to operation at optimum power, the vehicle is returned to control along characteristic curves of minimum fuel consumption.

Another preferred exemplary embodiment of the invention provides for the connection of a time-delay circuit behind the power setpoint signal generator for the purpose of suppressing gear changes of discrete transmissions when the power setpoint changes by small amounts in the vicinity of a gear change line of the gear change diagram. This provision reduces the total number of gear changes and thus reduces the wear and tear of the transmission.

In still another preferred embodiment of the invention, the input to the engine data memory may be selected to be either the prevailing engine speed or, during gear changes in a gear-type transmission, a signal obtained from a multiplication of the transmission output speed and the elected gear ratio. This provision acts as an aid in synchronizing the meshing gears of a discrete transmission during gear changes.

Finally, it is particularly effective if the power setpoint value is applied to the transmission data storage via a limiting circuit which is controlled in dependence on the second time derivative of the transmission output speed, i.e. in dependence on vehicle jolting. The effect of this circuit is to suppress excessive vehicle jolting, e.g. during gear changes, application of the brakes or excessive gas pedal application, by limiting the amount of gear change to be made.

Several embodiments of the apparatus according to the invention as well as characteristic curves illustrating the operation of the apparatus are shown in the drawing and are discussed in greater detail in the subsequent description.

THE DRAWINGS

DESCRIPTION OF PREFERRED EMBODIMENTS OF THE INVENTION

Figure 1:
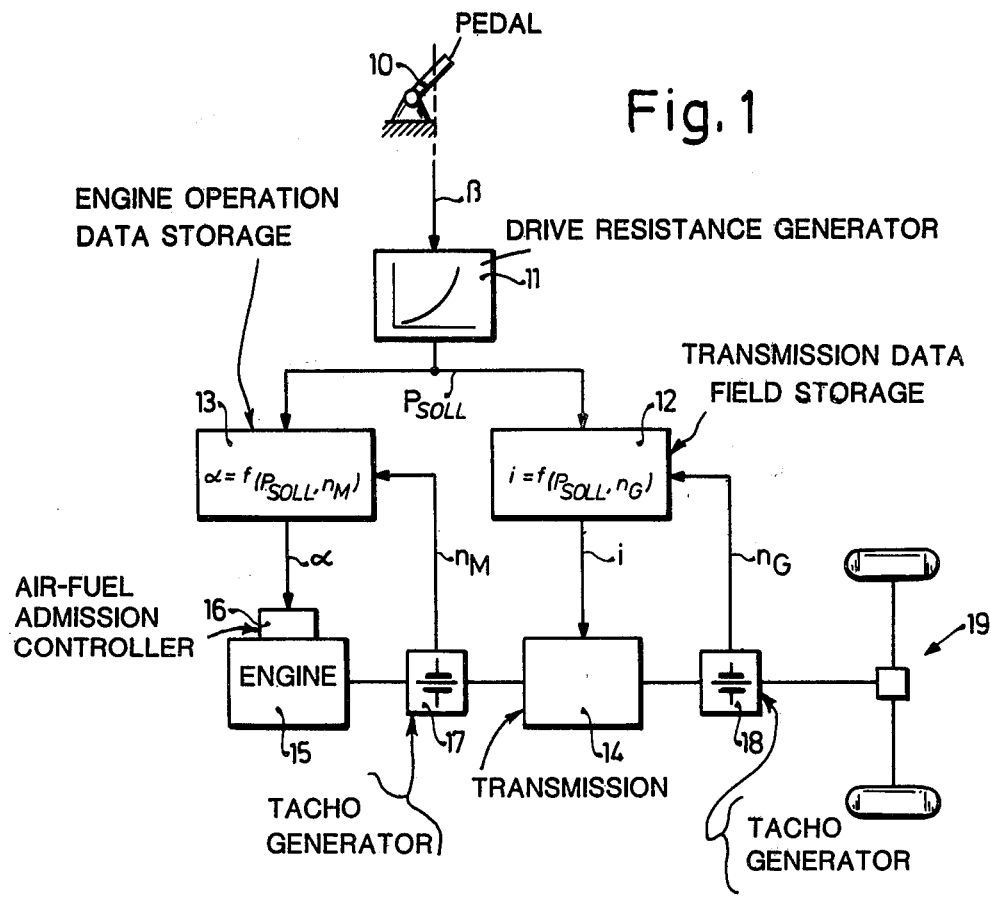
FIG. 1 is a schematic block diagram of a first embodiment of an apparatus according to the invention.

The apparatus according to the invention includes a control system for the drive motor/transmission unit also referred to as the vehicle drive train which performs a control of the transmission as well as of the drive motor on the basis of data in characteristic data memories. The initial value is the power setpoint signal $P_{soll}$ generated by a setpoint generator, e.g. the gas pedal of the vehicle. The characteristic transmission data storage contains, depending on the type of transmission used, the characteristic data of a stepless, e.g. hydrostatic transmission or that of a discrete (gear-type) transmission and defines the correct power transmission ratio i or the correct gear to be selected, respectively, in dependence on the power setpoint $P_{soll}$ and the vehicle speed. The characteristic engine data storage, on the other hand, contains the data field corresponding, for example, to an internal combustion engine, and delivers a value for the throttle valve position α in dependence on the power setpoint value $P_{soll}$ and the engine speed $n_M$. The characteristic data curve within the data field which is related to minimum fuel consumption of the internal combustion engine is of special significance in the operation of the system.

According to the invention, the power setpoint $P_{soll}$ is used in the transmission data field to select the prevailing transmission ratio "i" or the individual gear to be used.

A change in the transmission ratio results in a change in the engine speed $n_M$ in accordance with which the system controls the position α of the throttle plate of the engine. During this process, two different possibilities arise:

(a) If a rapid adjustment of the power is desired, the throttle valve position α is controlled on the basis of the transmission data field, i.e. in dependence on the power setpoint $P_{soll}$ and the engine speed $n_M$. Accordingly, the throttle valve is immediately set to make the desired power available.

(b) If control at optimum fuel consumption is desired, the throttle valve position α is changed along the specific data curve related to minimum fuel consumption in dependence on engine speed $n_M$. In this control process, the desired power is not obtained immediately and the transition from one operating point to the other occurs along the minimum fuel consumption curve.

Inasmuch as a control process which occurs according to (b), i.e. with minimum fuel consumption, necessarily results in a delayed availablity of engine power, this process cannot be employed in all road situations. If the desired power must be available immediately, for example during passing, it is necessary to switch over to a control process according to (a).

It is a feature of the apparatus according to the invention to provide for a combined control process in which the vehicle is operated at optimum fuel consumption during normal conditions, but in which a switchover to operation at maximum power is possible when needed.

BASIC SYSTEM

FIG. 1 is a schematic block diagram of a first embodiment of the apparatus according to the invention. The numeral 10 indicates a gas pedal which generates a signal corresponding to the pedal position β. This signal is applied to a function generator 11 which contains information related to characteristic drive resistance of the vehicle; its output is applied to the input of a transmission data field storage 12 and an engine operation data field storage 13. The output of the transmission data field storage 12 is applied to actuate a transmission 14 while the output of the engine data field storage 13 is connected to a control input of an internal combustion engine 15; e.g., as illustrated, to an air fuel mixture admission controller or generator 16, for example a carburetor or a fuel injection system. Placed near the drive shaft which connects the engine 15 and the transmission 14 is a tacho-generator 17 for generating an engine speed signal which is applied to a further input of the engine data field storage 13. Similarly, a second tacho-generator 18 generates a transmission output speed signal which is applied to a further input of the transmission data field storage 12. The power take-off of the transmission engages a suitable final power train 19. After processing by the drive resistance function generator 11 which will be described below with the aid of FIGS. 2 and 3, the gas pedal position signal β is applied to the inputs of the data field storage units 12 and 13. The transmission data field storage 12 contains the characteristic data field of a power transmission, i.e. values of the transmission ratio "i" as a function of the power setpoint $P_{soll}$ and of the transmission output shaft speed $n_G$ which is related to the vehicle speed $v_F$ and the magnitude of which is signaled to the transmission data field storage 12 by the tacho-generator 18. The output line of the transmission storage 12 thus carries the calculated transmission ratio "i" or the proper gear "i" as derived from the data field according to $i = f(P_{soll}, n_G)$ and this datum is used to adjust the transmission 14. As the vehicle speed does not change immediately, any adjustment of the transmission results in a change of the engine speed $n_M$. The engine data field storage 13 contains the characteristic data field of an internal combustion engine, i.e. values of the throttle valve position $\alpha$ as a function of the power setpoint $P_{soll}$ and the engine speed $n_M$; its output thus carries a control datum $\alpha$ derived from the data field according to $\alpha = f(P_{soll}, n_M)$ and this datum is used to control the internal combustion engine 15.

THE POWER SETPOINT CURVE

Figure 2:
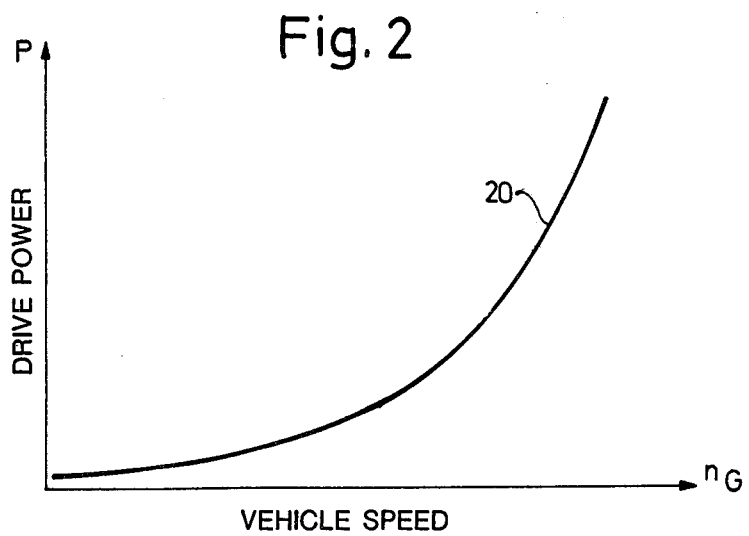
FIG. 2 is a diagram showing a curve corresponding to the drive resistance parabola of a motor vehicle.

FIG. 2 is a diagram of a quasi-parabolic curve 20, a so-called characteristic drive resistance curve of a motor vehicle, i.e. a curve showing the drive power as a function of vehicle speed or ground speed $n_G$. The drive resistance function generator 11 modifies the input signal $\beta$ in accordance with the curve 20 to correspond to the power setpoint value $P_{soll}$. The effect of the drive resistance function generator 11 is to linearize the path of the gas pedal, i.e. the pedal path is made approximately proportional to the vehicle speed.

Figure 3:
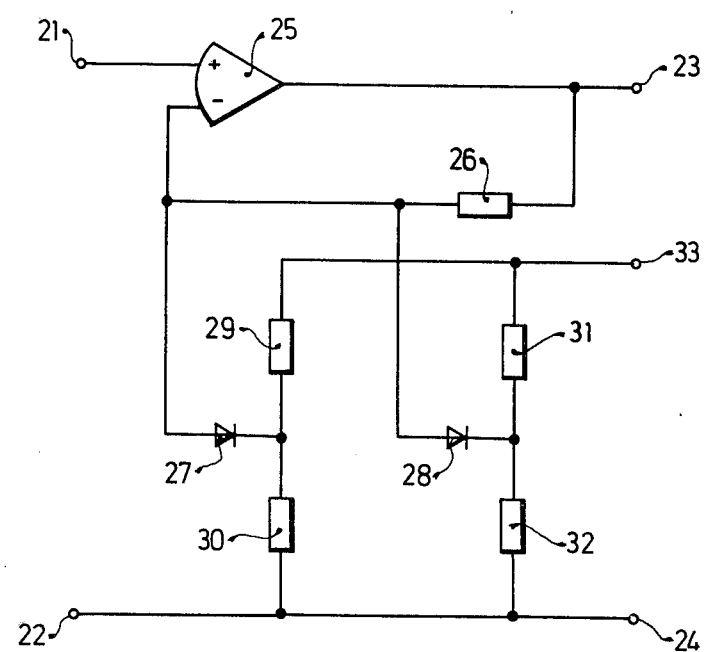
FIG. 3 is a circuit diagram of an electronic circuit for generating the curve shown in FIG. 2.

A circuit for generating a curve similar to the curve 20 of FIG. 2 is shown in FIG. 3. The circuit has two input contacts 21, 22 and two output contacts 23, 24. The input contact 21 is connected to the non-inverting input of an operational amplifier 25 whose output 23 is connected back to its inverting input via a feedback resistor 26. The inverting input of the operational amplifier 25 is further connected via respective diodes 27, 28 to the center taps of two voltage dividers 29, 30 and 31, 32, respectively, both of which are connected between a reference voltage contact 33 and a line connecting the input 22 and the output 24. Initially, the gain factor of the operational amplifier 25 is determined by the feedback resistor 26. However, when the voltage at the output of the operational amplifier 25 exceeds the levels set by the voltage dividers 29, 30 and 31, 32, respectively, the diodes 27 and 28 are rendered conducting sequentially, resulting in different gain factors. In this manner, the quasi-parabolic curve 20 of FIG. 2 is approximated by piecing together three straight lines of varying slope.

THE TRANSMISSION DATA FIELD

Figure 4:
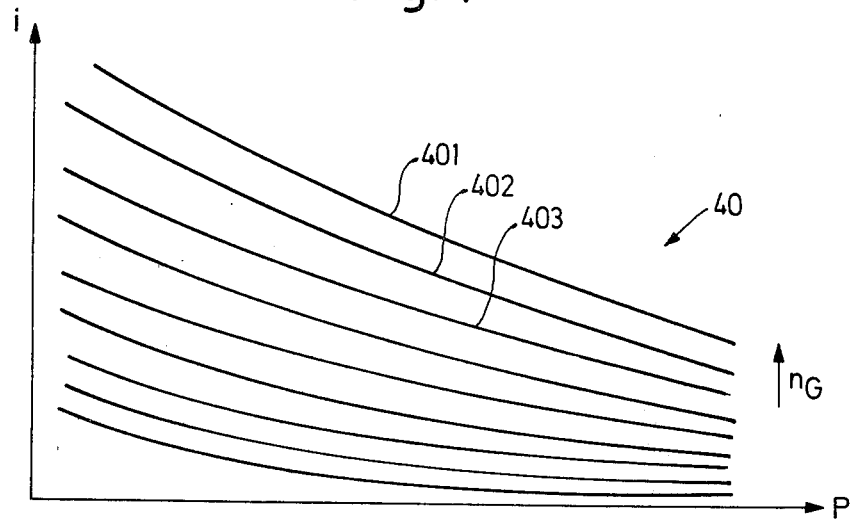
FIG. 4 is a diagram illustrating the characteristic data field of a stepless transmission.

FIG. 4 is a diagram of the characteristic data field 40 of a stepless transmission. A set of curves 401, 402, 403 etc. illustrates the dependence of the transmission ratio "i" on the transmitted power P, the common parameter being the transmission output speed $n_G$ which is related to the vehicle speed $V_F$. For example, the curve 401 is the characteristic curve related to the highest vehicle speed $V_F$ and the curve 403 is related to a somewhat lower vehicle speed $V_F$.

Figure 5:
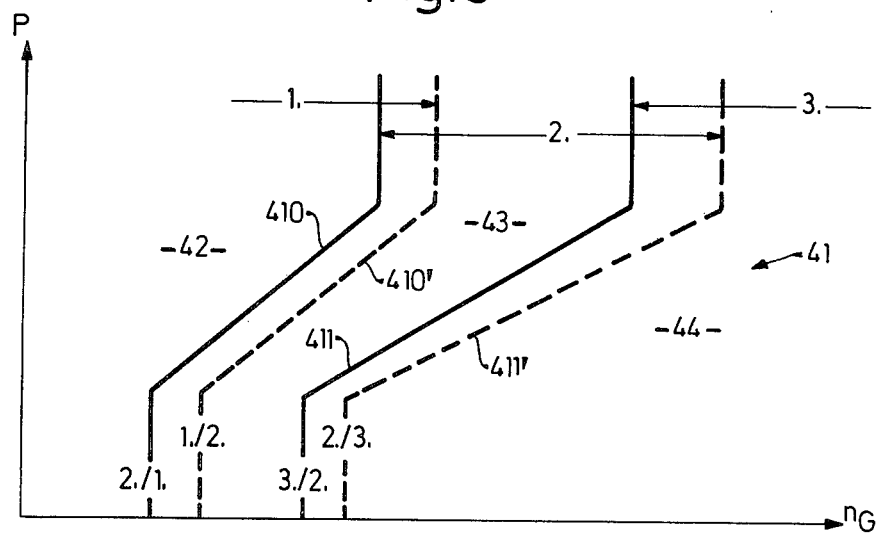
FIG. 5 is a diagram of the data field of a discrete (gear-type) transmission.

Similarly, FIG. 5 illustrates the data field 41 of a discrete (gear-type) transmission. The diagram shows the regions assigned to the different gears as a function of the transmitted power P and the transmission output speed $n_G$ which is related to the vehicle speed $V_F$. The regions 42, 43, 44 assigned to different gears are defined by lines 410, 410', and 411, 411'. The shift line 410 applies to a down-shift from second to first gear, the shift line 410' applies to an up-shift from first to second gear, the shift line 411 applies to a down shift from third to second gear and the shift line 411' applies to an up-shift from second to third gear. The hysteresis band between the shift lines 410, 411 and the shift lines 410', 411' prevents a so-called oscillation of the transmission, i.e., after a down-shift, an immediate up-shift due to the increasing vehicle speed is prevented. In general, the data field of the discrete transmission defines a first gear region which extends from the ordinate up to the shift line 410', a second gear region extending from the shift line 410 up to the shift line 411' and a third gear region extending from the shift line 411 toward positive values of the abscissa. In the regions 42, 43, 44, a single-valued association exists with the first, second and third gears, respectively, whereas, between the up-and down-shift lines, for example between lines 410 and 410', a single-valued association to a specific gear cannot be established unless it is known in which gear the transmission resides at the current time.

THE ENGINE DATA FIELD

Figure 6:
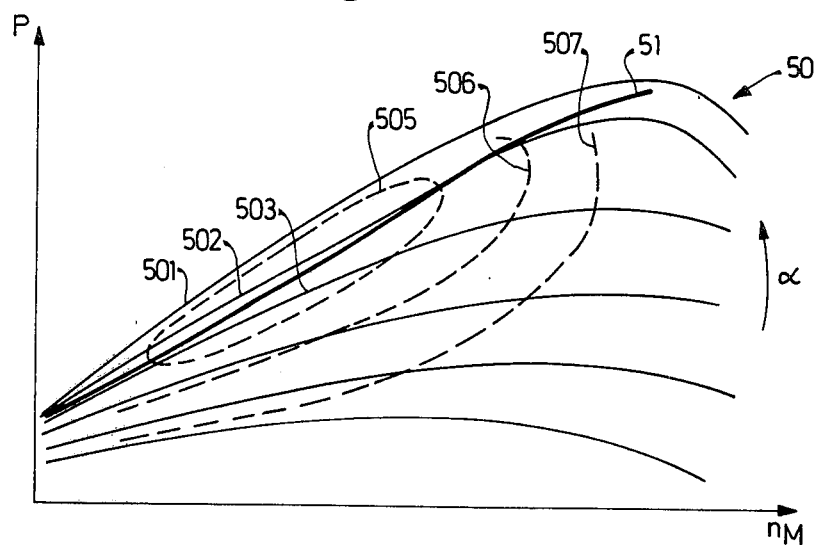
FIG. 6 is a diagram of a first engine data field of an internal combustion engine.
Figure 7:
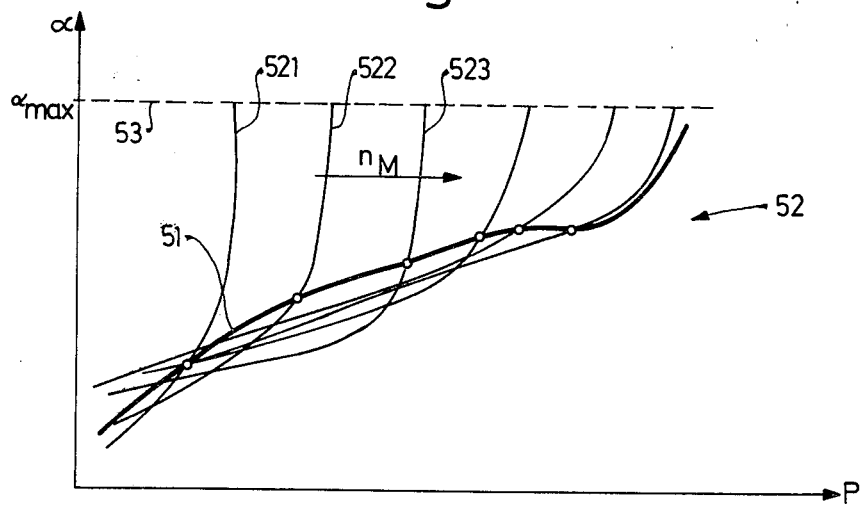
FIG. 7 is a diagram of a second engine data field of an internal combustion engine.

FIG. 6 is a diagram illustrating the characteristic data field 50 of an internal combustion engine as a family of curves 501, 502, 502 etc defining engine power P as a function of engine speed $n_M$ with a common parameter of throttle valve position $\alpha$. The curve 501 corresponds to full-load enrichment, i.e. to the maximum throttle opening angle $\alpha$. Superimposed on these curves are curves of constant fuel consumption 505, 506, 507 (shown dashed), the curve 505 indicating relatively low fuel consumption and the curve 507 indicating relatively high fuel consumption. The total number of lines 505, 506, 507 results in a curve 51 showing optimum fuel consumption as a function of engine speed $n_M$. Thus, for minimum fuel consumption, a particular engine speed $n_M$ is associated with a particular power P and a particular throttle valve angle $\alpha$. A different representation of the data field 50 of FIG. 6 is shown in FIG. 7. The engine data field 52 shown there illustrates the throttle valve position $\alpha$, with a maximum throttle valve angle line 53, as a function of the power P. The various characteristic curves 521, 522 523 represent different values of the common parameter $n_M$, the engine speed. The curve 521 is associated with a relatively low engine speed and the curve 523 is associated with a somewhat higher engine speed. Similarly to FIG. 6, the engine data field 52 contains a curve of optimum fuel consumption 51.

DATA FIELD ADDRESSING

The data illustrated in the data fields or individual curves thereof and depicted in FIGS. 4, 5, 6, 7 are stored in the characteristic data storages or memories 12 and 13, respectively. The memories 12, 13 may be constructed as illustrated, for example, in FIG. 8, where a transmission data memory is shown. One of the input variables, $P_{soll}$, is applied to an analog-digital converter 60 which is connected to a weighting circuit 61; the other input variable $n_G$ is applied to an analog-digital converter 62 which is connected to a weighting circuit 63. The outputs of the weighting circuits 61, 63 are applied to respective inputs of an adder 64 the output of which is connected to the input of a digital memory 65. The digital memory is preferably embodied as a Read-Only memory, i.e. it contains a multitude of storage locations, each of which is defined by an address and each of which may contain a datum. The output of the digital memory 65 is connected to a decoder 66.

Figure 8:
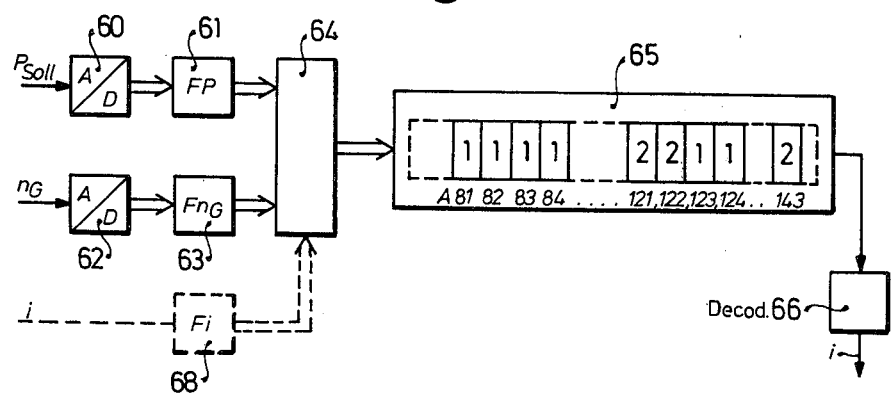
FIG. 8 is a schematic block diagram of one exemplary embodiment of a digital memory for storing a characteristic data field.
Figure 9:
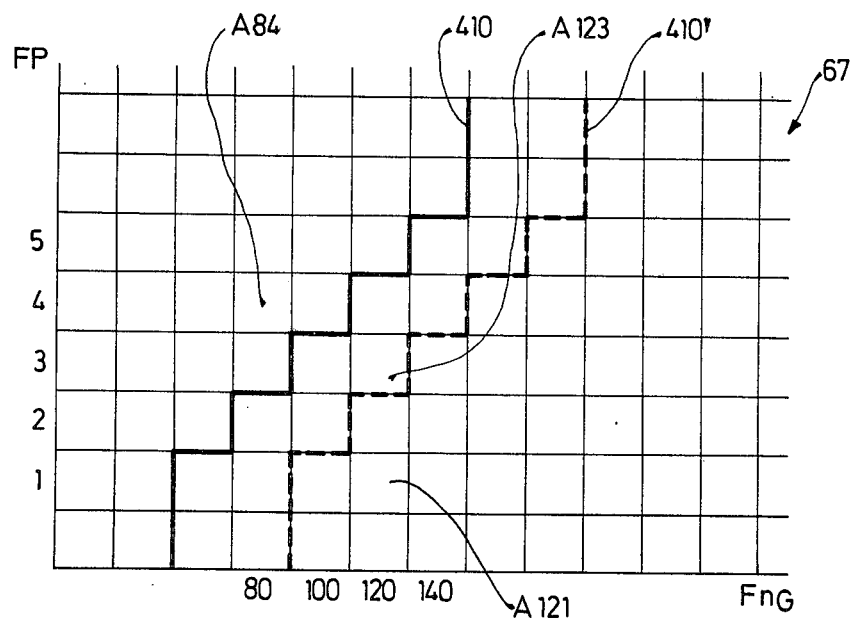
FIG. 9 is a quantized data field for illustrating the function of the apparatus of FIG. 8.

Prior to storage in the digital memory 65, a data field must be quantized in a raster 67 as illustrated in FIG. 9. Each of the squares of the raster is associated with a particular ordinate value and a particular abscissa value as shown in FIG. 9 for the case of a discrete transmission. The field values for the power are designated FP and range through 1, 2, 3, 4, 5 etc in increments of one while the field values of the transmission output shaft speed $Fn_G$ are incremented by steps of twenty. The association of a given datum of power P or of transmission output speed $n_G$ as obtained from the engine with the field values $F_p$ and $Fn_G$, respectively, is made by the respective weighting circuits 61 and 63. The appropriate address in the digital memory 65 is obtained by addition of the two field values of a given raster square. For example, a power value P having a field value FP=4 as weighted by the circuit 61 might be added to the weighted transmission output shaft speed value $Fn_G$=80 to yield the sum 4+80=A84 which constitutes the address generated by the digital adder circuit 64. The square whose address is A84 lies to the left of the down-shift line 410 and is therefore uniquely associated with the first gear. Accordingly, the storage location A84 in the digital memory 65 (FIG. 8) is inscribed with the value "1". Similarly, the storage location A121 of the memory 65 holds the value "2" because the associated raster square lies to the right of the up-shift line 410'. The storage location having the address A123 holds the value "1" although this raster square is not uniquely associated with one gear, both first gear and second gear being possible. In order to make the necessary distinction between these two possibilities, a weighting circuit 68 is connected to another input of the adder 64 and forms a gear index of, e.g., Fi= +40 when the second gear is engaged and Fi= +80 when the third gear is engaged. All of the storage locations corresponding to raster squares lying to the left of the up-shift line 410' are inscribed with the value "1".

If the vehicle is being accelerated from standstill with the transmission in first gear and in the status of the raster square A 123, the digital memory 65 supplies the value "1" to the decoder 66. As the vehicle speed $V_F$ increases, so does the transmission output speed $n_G$ and the transmission field value $Fn_G$. If the power field value FP remains constant, the new address supplied to the digital memory 65 becomes A143 and the associated storage location holds the value "2", causing an upshift to the second gear. At this time, the weighting circuit 68 supplies the second gear index value +40 to the adder 64, causing an apparent shift of the address from A143 to A183. The transmission status remains unchanged, however, because the location A183 also holds the value "2". Only after the transmission output speed $n_G$ is again reduced to a value associated with the transmission output field value $Fn_G$=80 does the addition of the field values FP, $Fn_G$ and Fi yield the sum A123 whose storage location contains the value "1", resulting in a down-shift to first gear. The method of adding a constant gear index value Fi, the magnitude of which depends on the prevailing gear, introduces a hysteresis effect between the up-shift line 410' and the down-shift line 410, the extent of which is equal to the gear shift value Fi, i.e. 40 in the above described situation. The width or extent of the hystereis band remains the same if the gear index value for the third gear is set at Fi=80. However, the width of the hysteresis band may be increased at the third gear shift lines by increasing the gear index value Fi for the third gear to a value greater than twice that of the second gear.

MANNER OF OPERATION

Stepless Transmission

(a) Control for Optimum Fuel Consumption

Figure 10:
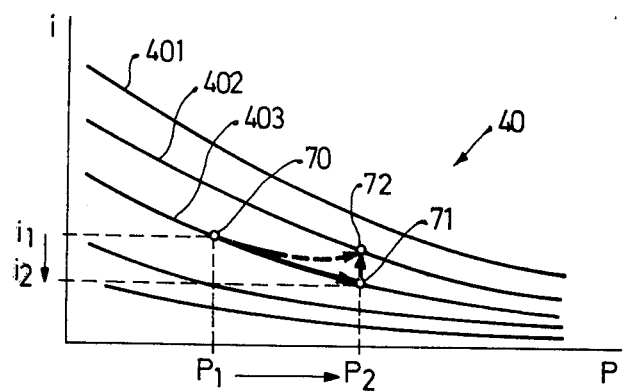
FIG. 10 is a diagram of the data field of a stepless transmission including the position of operating points during an increase of power.

FIG. 10 serves to illustrate the operation of a stepless transmission with optimum fuel consumption. Accordingly, the transmission data field storage 12 of FIG. 1 would contain the characteristic data field of a stepless transmission (field 40 of FIG. 4) while the engine data field storage 13 would contain an operating curve 51 for optimum fuel consumption as shown in FIG. 6 or 7.

Let the motor vehicle be found at the operating point 70 which corresponds to a power value $P_1$ and a transmission ratio $i_1$. The power setpoint value $P_{soll}$ is now increased from $P_1$ to $P_2$. Because the vehicle speed does not change initially, the transmission ratio is changed from the value $i_1$ to the value $i_2$ along the curve 403 of constant vehicle speed $V_F$ until it arrives at the new operating point 71.

Figure 11:
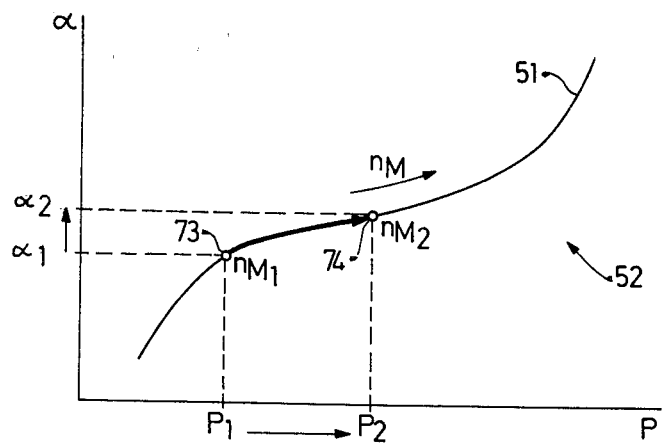
FIG. 11 is a diagram illustrating the position of operating points on a characteristic curve of minimum fuel consumption during an increase of power.

However, a change in the transmission ratio i at an assumed constant vehicle speed $V_F$ results in a change in the engine speed $n_M$. Let it be assumed that the initial operating point 70 of FIG. 10 corresponds to the initial operating point 73 of FIG. 11 which, at a power value $P_1$ and an engine speed $n_{M1}$, defines a throttle valve position $\alpha_1$. As the engine speed changes to the new value $n_{M2}$ due to the change in the gear ratio, the characteristic curve 52 of FIG. 11 defines a new value of throttle valve position $\alpha_2$. This value represents a new operating point 74 in the engine data field; during the power change, the engine never departed from the curve for optimum fuel consumption.

Figure 12:
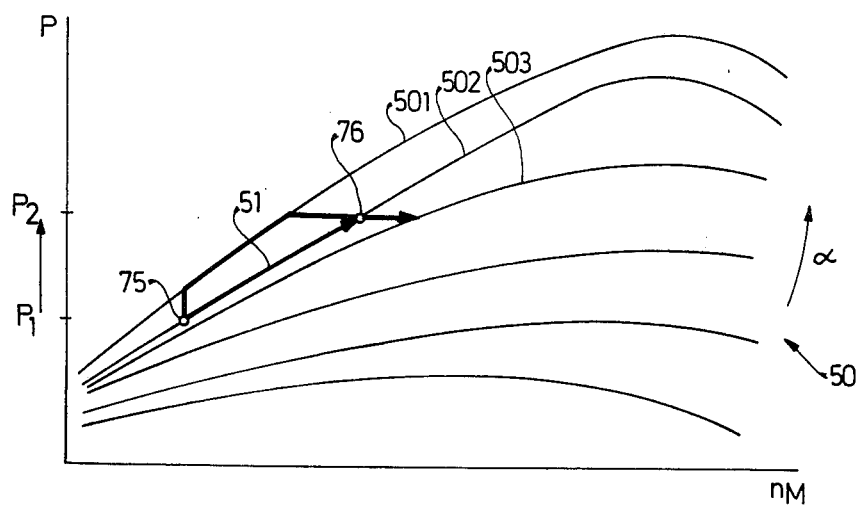
FIG. 12 is a diagram of the two graphs of a characteristic engine data field showing the position of operating points during power increase, and relating engine speed to power—graph (a) and to vehicle speed—graph (b).

If the aforementioned operation is transposed to the engine data field shown in FIG. 6, one obtains the conditions shown in FIG. 12 in which the operation proceeds from an operating point 75 to an operating point 76 along the curve 51 of optimum fuel consumption.

The curve 51 for optimum fuel consumption is generated within the engine data field storage 13 by a per se known function generator which may advantageously be constructed similarly to the drive resistance function generator 11 shown in FIG. 3. When an engine data storage 13 such as the one depicted in FIG. 8 is used, the optimum curve may be obtained by suppression of all addresses above the curve 51 in the data field 50. This insures that the operating point of the engine 15 cannot depart from the curve 51 during a power increase from $P_1$ to $P_2$.

Stepless transmission

(b) Control for Optimum Power

Figure 13:
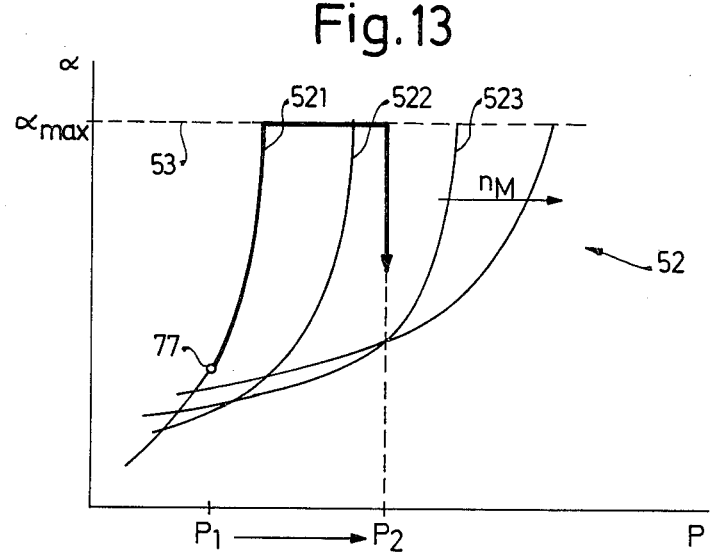
FIG. 13 is a diagram of another engine data field showing the position of operating points during power increase.

In order to obtain optimum power control while using a stepless transmission, an engine data field 50 or 52 according to FIGS. 6, 7 is used in the engine data field storage 13. This type of control process is illustrated in FIG. 13. Under optimum power control, the throttle valve position $\alpha$ appearing at the output of the engine data storage 13 is derived from the engine speed $n_M$ and the power setpoint value $P_{soll}$. Accordingly, if the initial operating point is point 75 of FIG. 12 and the chosen power setpoint is $P_2$, the throttle valve position $\alpha$ is increased. The diagram of FIG. 13 shows that the throttle valve position $\alpha$ is initially increased rapidly up to the line of maximum throttle opening 53 from the initial operating point 77. Thereafter, the engine power is increased along the maximum throttle opening line 53 while the engine speed $n_M$ increases. Once the desired power setpoint value $P_2$ is reached, the throttle valve position $\alpha$ may again be decreased while the engine speed continues to grow as seen in FIG. 13.

In the above-described case, the engine power is available more rapidly; the path taken by the operating point is shown dashed in FIG. 10: from the operating point 70, the engine operation no longer proceeds approximately along the curve 403 of constant vehicle speed; instead, the vehicle speed increases and the desired power is attained at the operating point 72.

During this control at optimum power, the engine speed $n_M$ also rises above the curve 51 for optimum fuel consumption, i.e. control process does not terminate at the operating point 76 of FIG. 12 as was the case during control with optimum fuel consumption. Instead, the engine speed $n_M$ continues to increase until the drive resistance parabola of the vehicle is encountered for the prevailing conditions.

Discrete transmission (a) Control for Optimum Fuel Consumption

The method described above for control at optimum fuel consumption is not applicable to discrete gear transmissions because the transmission ratio "i" does not change at a particular gear setting and the engine operation cannot be controlled on the basis of the engine speed $n_M$ which results from changes in transmission ratio. Thus, optimum fuel control with a discrete gear transmission requires supplying the power setpoint value $P_{soll}$ to the engine data field storage 13 and to derive the optimum fuel throttle setting $\alpha$ from the curve 51 for optimum fuel consumption according to FIG. 11. Thus, within a region 42, 43, 44 of FIG. 5, optimum fuel control is possible by adjusting the throttle valve position $\alpha$ as a function of the power setpoint $P_{soll}$ via the engine data field storage 13 and no longer as a function of the engine speed $n_M$. However, this manner of control can be employed only to limited extent because the optimum fuel consumption curve 51 must be abandoned at each gear change. For this reason, it is necessary to make an alternative combination of the control for optimum fuel consumption with the control for optimum power, in the manner described below.

Discrete transmission (b) Control for Optimum Power

Figure 14:
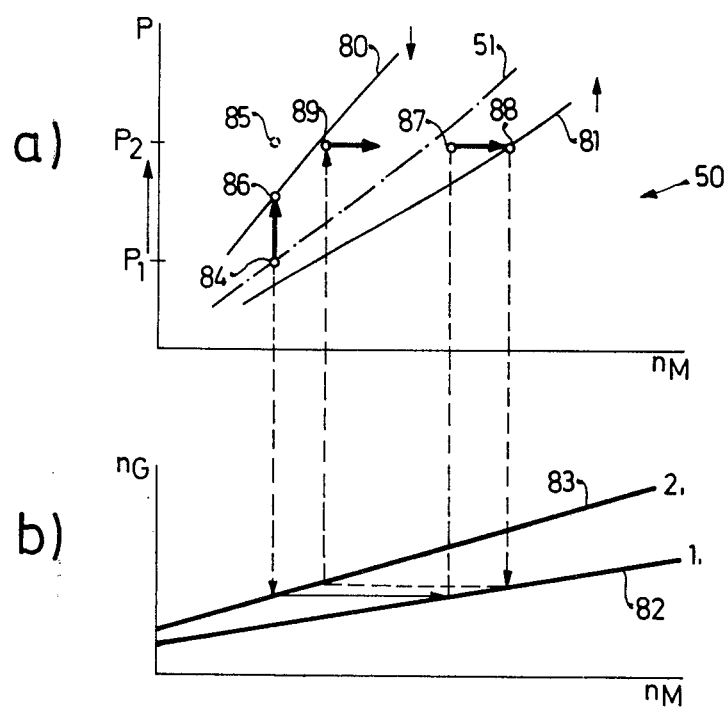
FIG. 14 is a diagram of a data field of a discrete transmission showing the position of operating points during power increase.

The shift lines 410, 410' and 411, 411' of the transmission data field 41 in FIG. 5 are so positioned that, for each gear, the down-shift line lies in the region of full-load enrichment of the engine, as indicated by the line 80 in FIG. 14a while the given up-shift line lies somewhat below, e.g. 15% below, the curve 51 for optimum fuel consumption of the particular engine, as indicated by the curve 81 of FIG. 14, graph (a). Under these conditions, the operation of the engine 15 necessarily takes place within a narrow region around the optimum fuel curve 51, resulting in an especially economical operation. FIG. 14, graph (b) illustrates the operation at optimum power with a discrete transmission and shows translator lines 82, 83 for first and second gear, respectively. These lines serve to translate the prevailing operation point in the engine data field 50 of 14a according to the prevailing gear ratio, i.e. according to the selected gear.

Let it be assumed that the engine is operating at an operating point 84 which corresponds to a power $P_1$ in second gear. If the gas pedal now sets a new power setpoint $P_2$, it is not possible to perform a direct approach to that point in second gear because the associated, but fictitious, operating point 85 would lie above the down-shift line 80. Accordingly, the throttle valve is opened in the manner described above and, when the operating point 86 is reached on the down-shift line 80, the transmission is shifted down into first gear, defining a new, translated operating point 87 which is obtained from the operating point 85 by use of the translating lines 82,83. If the power level $P_2$ suffices to accelerate the vehicle, the engine speed $n_M$ increases until the operating point 88 on the up-shift line 81 is reached. The transmission is then shifted into second gear, resulting in a translated operating point 89. As may be appreciated from the diagrams of FIG. 14, which depicts optimum power operation with a discrete transmission, the operating points do not move on the curve 51 for optimum fuel consumption but they move, nevertheless, within a narrow region about that curve and a favorable fuel consumption can thus be achieved.

Switchover from Control for Optimum Fuel Consumption to Control for Optimum Power Controlled operation at optimum fuel consumption is not adequate for all operational situations, e.g. if the driver demands rapid availability of the desired power. Furthermore, a discrete transmission sets the above-described limits to optimum fuel control. A particularly preferred embodiment of the invention provides circuit elements which make possible a switchover from control for optimum fuel consumption to control for optimum power.

Figure 15:
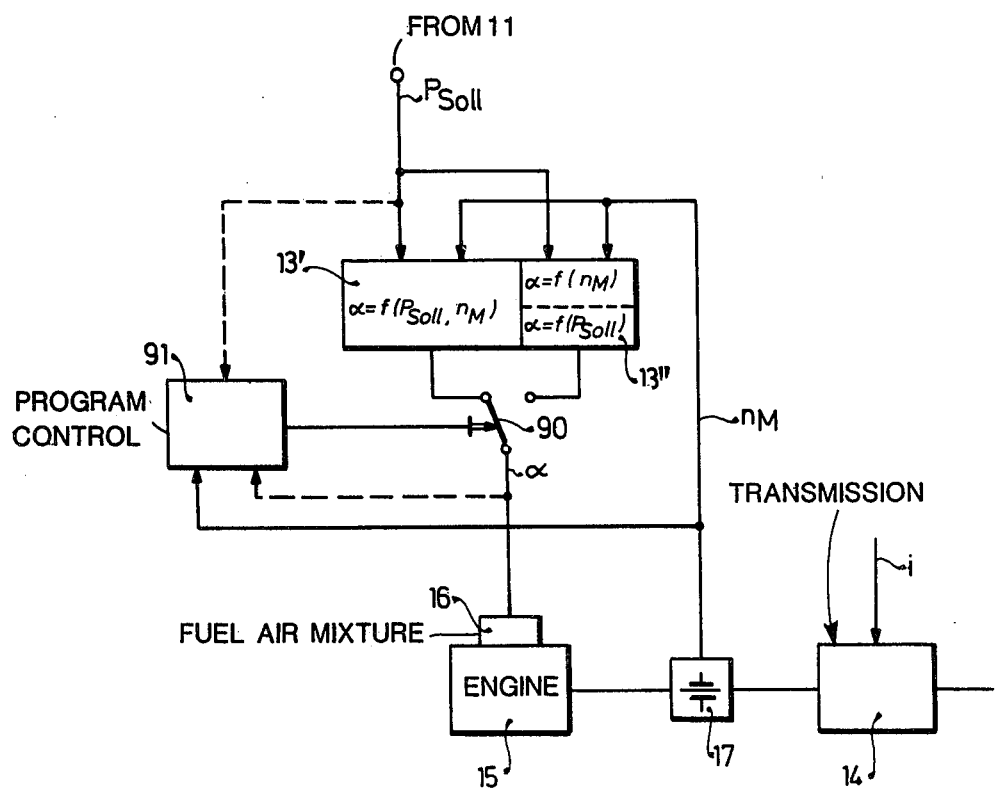
FIG. 15 is the schematic block diagram of a second embodiment of the apparatus according to the invention including a program control unit.

As shown in FIG. 15, these elements include a switch 90 which can connect the control input of the engine 15, i.e. the mixture generator 16, either to the output of a first engine data curve storage 13' or to the output of a second engine data curve storage 13''. The first engine data curve storage 13' contains an engine data field 50 or 52 according to FIGS. 6,7 and pertaining to optimum power control while the second engine data curve storage 13'' contains the optimum fuel consumption curve 51. According to a first program, switch 90 is actuated by the program control unit 91 on the basis of engine speed $n_M$ and power setpoint $P_{soll}$, or, alternatively, on the basis of gas pedal excursion $\beta$ or throttle valve position $\alpha$. The effect of the switchover is to engage optimum power operation whenever the gas pedal is actuated abruptly. In a second program of the program control unit 91, the switchover to optimum power operation occurs when the desired power increment $\Delta P$ exceeds a given amount. Finally, in a third program of the program control unit 91, the switchover to optimum power operation occurs if the desired power level $P_{soll}$ has not been attained after a time $\Delta t$. These methods insure the availability of the desired power when needed and as a consequence of the usual driver action, i.e. the full depression of the gas pedal, by switchover to optimum power control and by accepting operation at an increased level of fuel consumption.

The return switchover from control at optimum power to control at optimum fuel consumption takes place, according to the invention, when the engine speed $n_M$ has attained the value $n_{Msoll}$ which corresponds to the power setpoint $P_{soll}$ at optimum fuel consumption. As a result, the operating point in the engine data field 50 of FIG. 12 which, for optimum power, had moved along the curve 501 up to the power $P_2$ and thereafter parallel to the engine speed axis of the diagram, now does not continue to move until it reaches the drive resistance parabola but is stopped at the operating point 76 which lies on the optimum fuel consumption curve. This point is in the domain of optimum fuel control and this domain remains in effect during the subsequent motion of the vehicle.

Figure 16:
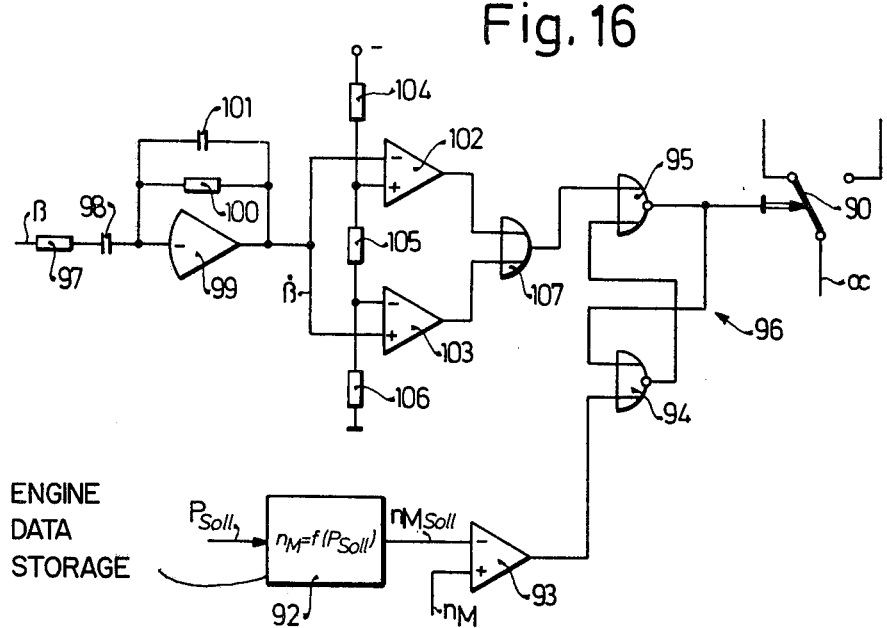
FIG. 16 is a circuit diagram of a first embodiment of a program control unit.
Figure 17:
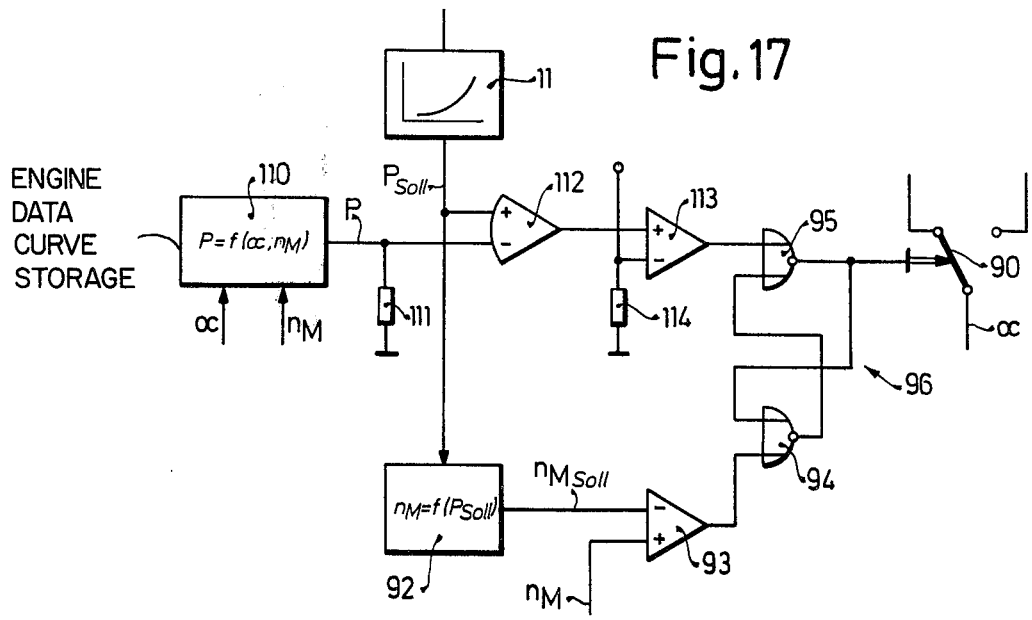
FIG. 17 is a circuit diagram of a second embodiment of a program control unit.
Figure 18:
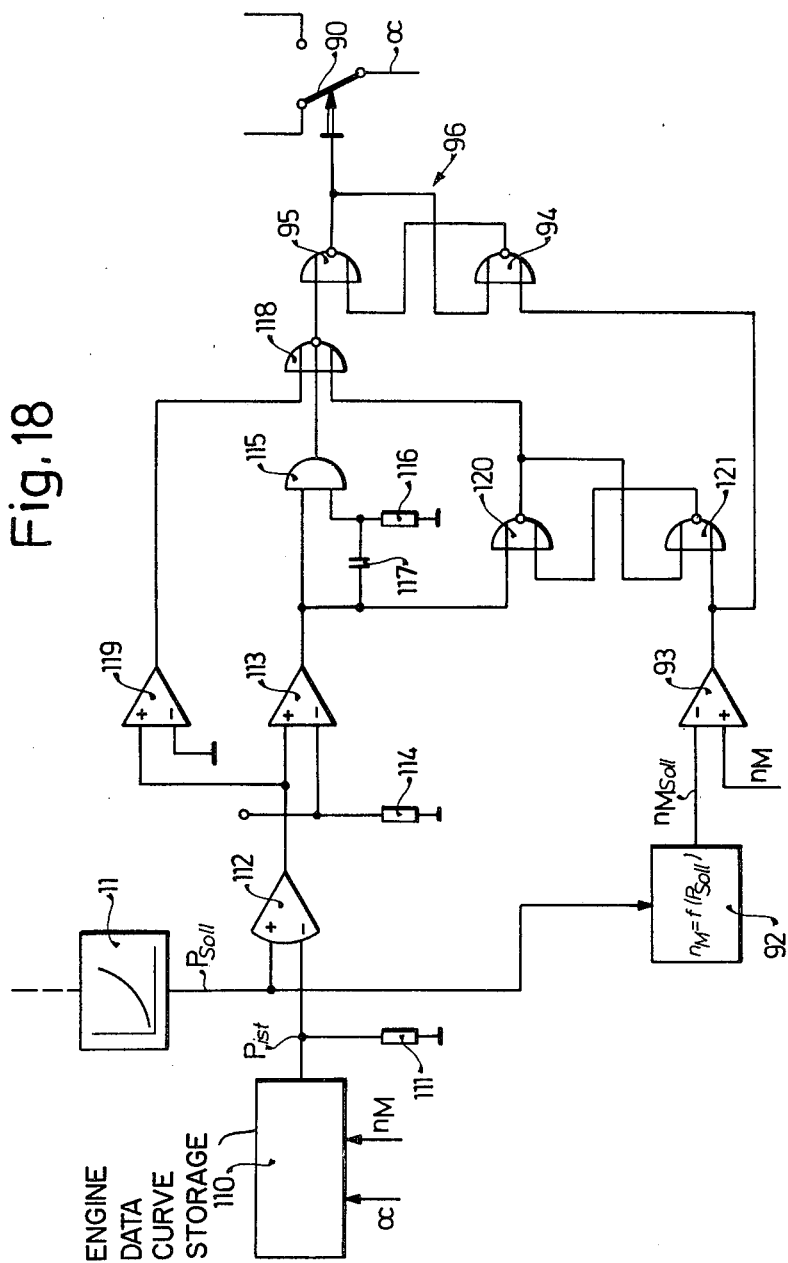
FIG. 18 is a circuit diagram of a third embodiment of a program control unit.

The nominal engine speed $n_{Msoll}$ is provided, as seen in FIGS. 16–18, by a third engine data line storage 92 which receives the power setpoint $P_{soll}$. The construction of the third engine data storage 92 is equivalent to that of the previously described engine data storages, obviating a separate description. Its output signal is applied to the negative input of comparator 93 whose positive input receives a signal related to engine speed $n_M$. Thus, the comparator 93 switches to a logical "1" when the engine speed $n_M$ has attained the value $n_{Msoll}$ for optimum fuel consumption.

In the first embodiment of the program control unit 91, shown in FIG. 16, the signal related to the gas pedal excursion $\beta$ passes through a resistor 97 and a capacitor 98 to the input of an amplifier 99 having a parallel feedback circuit with a resistor 100 and a capacitor 101, respectively.

The resulting known differentiating circuit produces an output signal equal to the first time derivative $\dot{\beta}$ of the gas pedal travel $\beta$. This signal is applied to the negative input of a comparator 102 as well as to the positive input of a comparator 103. The positive input of the comparator 102 and the negative input of the comparator 103 are connected to respective taps of a voltage divider circuit composed of resistors 104, 105 and 106 connected in series between a reference voltage and ground. The outputs of the two comparators 102, 103 are connected to respective inputs of an OR gate 107. The output of the OR gate 107 is a logical "1" if the first time derivative $\dot{\beta}$ of the gas pedal travel $\beta$ has exceeded a given positive or negative amount. A logical "1" signal at the output of the OR gate 107 sets a flipflop 96 composed of NOR gates 94,95. An output of the flipflop 96 connected to the control input of the switch 90 then carries a logical "0", causing the switch 90 to connect the control input of the engine 15 to the engine data curve storage 13' which is associated with optimum power, as shown in FIG. 16. When the output of the comparator 93 becomes a logical "1", the flipflop 96 is reset, its output carries a "1" and the switch 90 re-connects the control input of the engine 15 to the data storage 13" associated with optimum fuel consumption.

FIG. 17 illustrates a circuit diagram of a second embodiment of the program control unit 91. In this embodiment, the desired power setpoint $P_{soll}$ is compared with the actual power P. A switchover to optimum power occurs if the difference between these two values exceeds a given amount. The actual power must be ascertained by a fourth engine data curve storage 110 which receives the throttle valve position $\alpha$ and the engine speed $n_M$ and whose output is a value corresponding to the actual power P, as already described several times. The voltage across a resistor 111 which is related to the engine power P is applied to the inverting input of an operational amplifier 112, whose non-inverting input receives the signal corresponding to the power setpoint $P_{soll}$. The output of the operational amplifier 112 is a measure of the difference between the two power levels and it is applied to the positive input of a comparator 113 whose negative input receives a fixed potential obtained from an auxiliary voltage via a resistor 114 to define a desired power difference threshold. The output of the comparator 113 changes to a logical "1" if the desired power setpoint $P_{soll}$ deviates from the actual engine power P by more than the preset amount. The flipflop 96 is again set and the switch 90 changes over from optimum fuel control to optimum power control.

FIG. 18 illustrates a third embodiment of the program control unit 91. This embodiment is intended to switch to optimum power operation if the desired power level $P_{soll}$ has not been attained after a given time period $\Delta t$. However, the application of this test is meaningful only above a given difference between the nominal and actual power levels. Accordingly, as was done in the embodiment of FIG. 17, a test is made by means of the operational amplifier 112 and the comparator 113 to determine if the given power difference is exceeded. If so, the output of the comparator 113 carries a logical "1" which starts a timing circuit composed of an AND gate 115, a resistor 116 and a capacitor 117 and also sets a flipflop composed of NOR gates 120,121.

The output of the AND gate 115 and of the flipflop 120,121 are applied to respective inputs of a NOR gate 118. A third input of the NOR gate 118 is connected to the output of a comparator 119, whose positive input is connected to the output of the operational amplifier 112 and whose negative input is grounded. The output of the NOR gate 118 is connected to the set-input of the flipflop 96; the output of the comparator 93 serves to reset the flipflop composed of NOR gates 120,121 and the flipflop 96.

The function of the circuit illustrated in FIG. 18 is as follows: During operation at optimum fuel consumption, the flipflops 96 and 120,121 are reset and their outputs carry logical "1". Accordingly, the switch 90 is set for optimum fuel consumption and the NOR gate 118 is blocked. If the desired power setpoint $P_{soll}$ exceeds a given difference with respect to the actual power P, the output of the comparator 113 changes to a logical "1" and thus sets the flipflop composed of NOR gates 120,121 so that the third input of the NOR gate 118 has a logical "0". At the same time, a logical "1" appears at the first input of the AND gate 115 and, for a time determined by the RC circuit 116, 117, also at the second input. Thus, for a time $\Delta t$, the output of the AND gate 115 is a logical "1" which is applied to the second input of the NOR gate 118. At the expiration of the time $\Delta t$ which is determined by the RC circuit 116, 117, the signal at the output of the AND gate 115 drops back to a logical "0". At that time, the NOR gate 118 tests if the difference between the power setpoint $P_{soll}$ and the actual power has dropped to zero. If that is not the case, the output of the comparator 119 becomes logical "0" so that all three inputs of the NOR gate 118 carry a "0", causing its output to become a logical "1" which sets the flipflop 96 that causes the switch 90 to change over to operation at optimum power.

Apparatus With Delayed Power Setpoint

Figure 19:
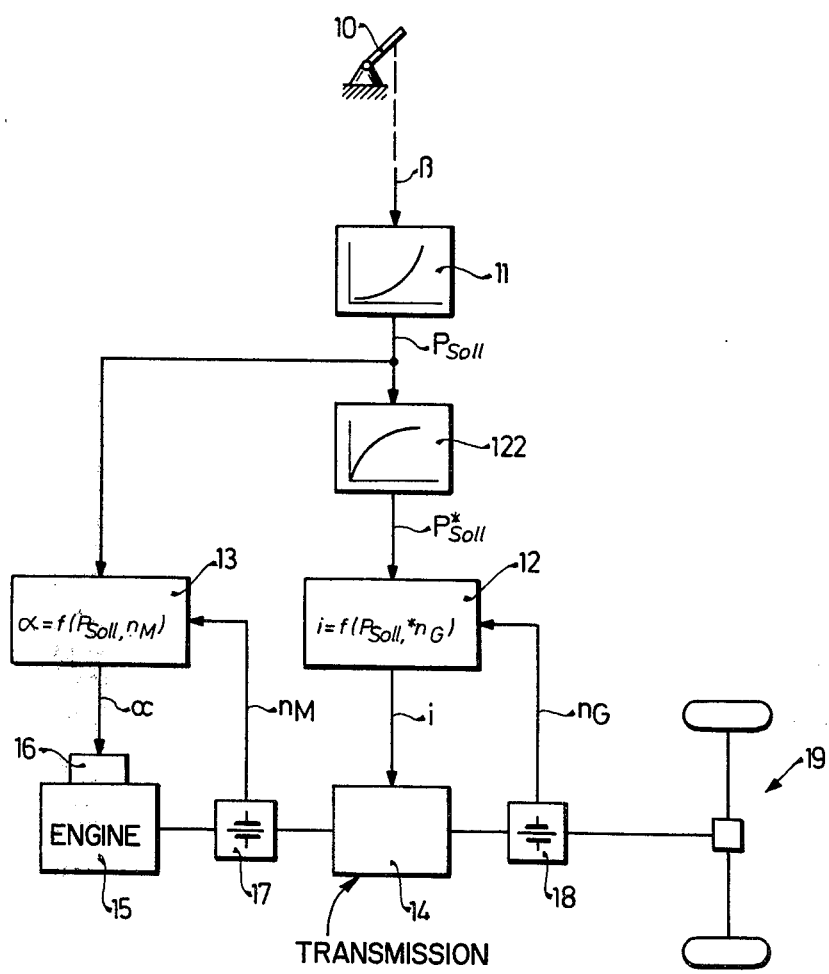
FIG. 19 is a circuit diagram of a third embodiment of a program control unit including a delay circuit.
Figure 20:
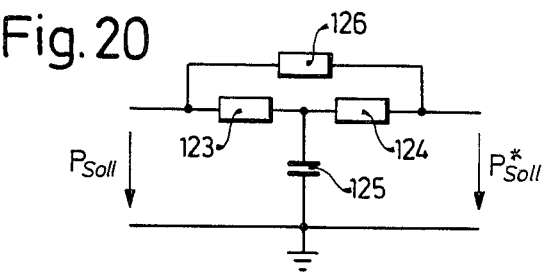
FIG. 20 is a circuit diagram of a delay circuit.
Figure 21:
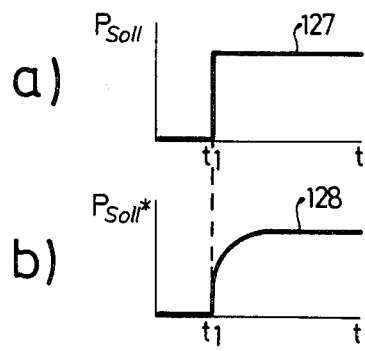
FIG. 21 is a diagram showing the response of the circuit of FIG. 20 to a step function in which graph (a) represents an input step function and graph (b) the resulting delayed response.

As is apparent from the various engine data field diagrams, each gear change causes the operating point to deviate from the curve 51 for optimum fuel consumption of the engine and thus causes increased fuel use. Accordingly, a third embodiment of the apparatus of the invention, illustrated in FIG. 19, provides a delay circuit 122 between the drive resistance function generator 11 and the input to the transmission data curve storage 12. Therefore, the transmission data storage 12 which is part of the superimposed transmission control loop receives the desired power setpoint $P_{soll}$ only after a delay. The delay circuit 122 may be constructed in known manner, for example as a T-filter with a circuit as shown in FIG. 20. In the quadrupole circuit shown there, one input and one output are connected directly while the others are connected across two series resistors 123,124 and a parallel resistor 126. The junction of resistors 123,124 is connected via a capacitor 125 to the junction of the directly connected in- and outputs. The illustrated circuit transforms the power setpoint signal $P_{soll}$ into a delayed power setpoint signal $P_{soll}*$. For example, if the input signal $P_{soll}$ is a step function, shown in FIG. 21, graph (a), i.e. a function which jumps from the value 0 at time $t_1$ to a finite value, the delayed output signal 128 corresponding to $P_{soll}*$ has the form shown in FIG. 21, graph (b).

Figure 22:
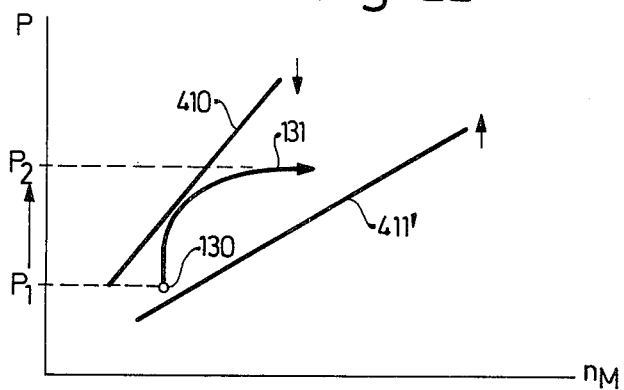
FIG. 22 is a diagram illustrating the position of operating points in the data field of a discrete transmission when using the apparatus of FIG. 19.

FIG. 22 illustrates the effect of the insertion of the delay circuit 122. If the engine 15 resides at the operating point 130, corresponding to a power level $P_1$, and the gas pedal 10 defines a new power setpoint $P_2$, the down-shift line 410 would normally be crossed. However, the intermediate delay circuit 122 prevents the abrupt increase of the power setpoint to the value described by the gas pedal 10 and forces it along the curve 131 which is bent so as to prevent crossing the down-shift line 410. Accordingly, the desired power $P_2$ is attained without requiring a gear change.

Apparatus With Synchronizing Circuit

Figure 23:
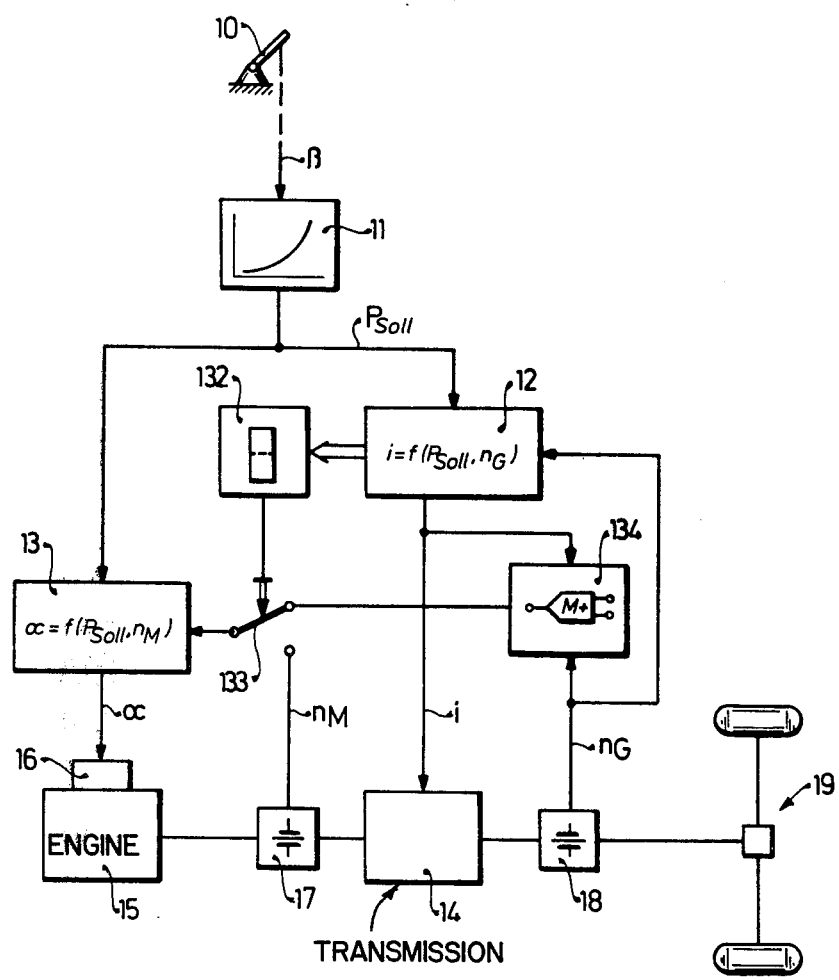
FIG. 23 is a schematic block diagram of a fourth embodiment of the apparatus of the invention including a synchronizing device.

A fourth embodiment of the apparatus of the invention is shown in FIG. 23. This embodiment includes provisions for the necessary synchronization between meshing gears in a discrete gear transmission during a gear change. For this purpose, the transmission data curve storage 12 generates a gear shift signal which sets a flipflop 132 at the start of a gear change and resets it at the end of the gear change. The flipflop 132, in turn, controls a switch 133 which can switch the engine speed input of the engine data curve storage 13 from the engine speed tacho-generator 17 to a multiplying circuit 134 having inputs connected to the outputs of the transmission data storage 12 and the transmission speed tacho-generator 18. Multiplication of the transmission output shaft speed $n_G$ with the transmission ratio of the new gear defines the engine speed $n_M$ which makes possible a gentle meshing of the gears, i.e. a synchronization.

This "synchronized" engine speed is applied by the switch 133 to the engine data curve storage 13 which so controls the engine 15 as to cause it to run at the synchronized speed. When the gear change is complete, the transmission data storage 12 resets the flipflop 132 and the engine data storage 13 again receives the actual engine speed signal $n_M$ at its engine speed input.

Apparatus Including Jolt Limiter

Figure 24:
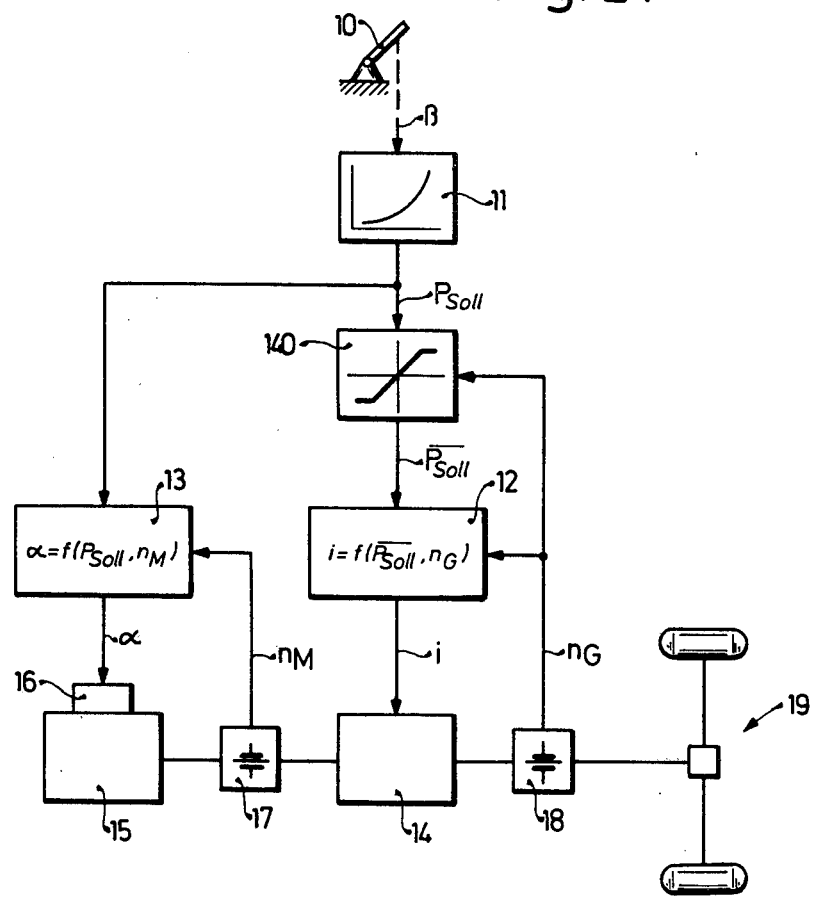
FIG. 24 is the schematic block diagram of a fifth embodiment of the invention with a jolt-limiting device.

In a fifth embodiment of the apparatus of the invention, of which an example is illustrated in FIG. 24, provision is made for limiting vehicle jolts. As is well known, a vehicle jolt occurs primarily during gear changes in discrete gear transmissions but may also occur due to heavy braking and accelerating. The vehicle jolt may be treated in a control system as the first time derivative of the vehicle acceleration or the second time derivative of the vehicle speed. Vehicle jolts are unpleasant for the occupants of the vehicle and reduce their comfort.

In the apparatus shown in FIG. 24, the transmission output speed tacho-generator 18 is coupled to a supplementary limiter circuit 140 which is connected between the drive resistance function generator 11 and the transmission data storage 12. The limiter circuit is controlled by the effect of the vehicle jolt and transforms the power setpoint value $P_{soll}$ into a modified power setpoint $\overline{P_{soll}}$. This provision is a special advantage in vehicles with stepless transmissions in which the shifting speed of the transmission can thus be limited in dependence on vehicle jolt. For example, if the gas pedal sets a power setpoint $P_{soll}$ which would result in an acceleration causing excessive vehicle jolt, the limiting circuit makes the power setpoint $\overline{P_{soll}}$ effective and thus limits the adjustment speed of the transmission to a value at which the vehicle jolt remains within the prescribed limits.

Figure 25:
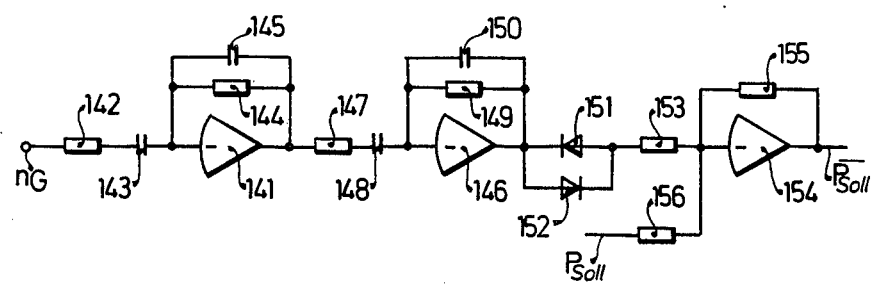
FIG. 25 is a circuit diagram of a jolt-limiting device.

A limiting circuit 140 may be constructed as shown in the diagram of FIG. 25. The input signal, corresponding to the transmission output speed $n_G$ passes through a resistor 142 and a capacitor 143 to the input of an operational amplifier 141 having a feedback branch including a resistor 144 and a capacitor 145. The output of the operational amplifier 141 is passed through a resistor 147 and a capacitor 148 to the input of an operational amplifier 146 which has a feedback branch including a resistor 149 and a capacitor 150. The operational amplifiers 141,146 so connected represent differentiating circuits similar to that shown in FIG. 16. The output of the amplifier 146 thus carries a signal which corresponds to the second time derivative $\ddot{n}_G$ of the transmission output speed $n_G$, i.e. to the vehicle jolt. This signal is passed via parallel, oppositely polarized diodes 151, 152 and a resistor 153 to a summation point which constitutes the input of an operational amplifier 154. The amplifier has a feedback branch with a resistor 155. The summation point also receives a signal corresponding to the power setpoint $P_{soll}$ via a resistor 156. The effect of the circuit of FIG. 25 is that, when the second time derivative $\ddot{n}_G$ of the transmission output speed $n_G$ exceeds a given value determined by the knee potential of the diodes 151, 152, the input voltage of the operational amplifier 154 is clamped and the amplification of the power setpoint signal $P_{soll}$ is thus limited. The presence of oppositely polarized, parallel diodes 151,152 insures that the power setpoint signal is limited when either a negative or positive limiting value of the vehicle jolt is exceeded.

We claim:

1. An apparatus for controlling an engine/transmission unit or drive train of a motor vehicle, including an operating member (10) for defining a power setpoint of the engine and at least one engine operation data storage means (13) containing characteristic power curves of said engine, the engine and the transmission being controlled by means of said at least one engine data storage means in dependence on the power setpoint in such a manner that optimum energy consumption of the engine results, comprising, according to the invention, a transmission data storage means (12) containing a characteristic transmission data field including optimum transmission i as a function of (a) power setpoint $P_{soll}$, to provide for power delivery under optimum conditions, and of
(b) the vehicle velocity $v_F$ to provide for optimum vehicle operation at the vehicle speed, according to the relationship
$i = F(P_{soll}, v_F)$;

a first control loop connected to set the transmission ratio in accordance with the power setpoint (P$_{soll}$) on the basis of the transmission data field;

and a second control loop connected to set a fuel control α, wherein the fuel input control α is related to engine operation in dependence on the resulting engine speed (n$_M$) in accordance with the engine power curves contained in said engine operation data storage means (13) and which defines the engine power P as a function of engine speed (n$_M$) and of fuel input control position α according to the relationship P=f(n$_M$, α);

and wherein the control of the transmission ratio i by said first control loop for optimum operation of the drive train has priority over control by said second control loop.

2. An apparatus according to claim 1, characterized in that the engine is an internal combustion engine (15), and an air-fuel mixture generator (16) is provided controlling engine operation in accordance with the fuel input control α.

3. An apparatus according to claim 2, wherein the engine has a carburetor;

characterized in that the fuel input control α comprises characteristics of electrical pulses triggering the on operation of the injection valve of a fuel injection system.

4. An apparatus according to claim 2, wherein the engine has an electrical pulse operated fuel injection system, characterized in that the fuel input control α comprises characteristics of electrical pulses triggering the operation of the injection valves of the fuel injection system.

5. An apparatus according to claim 1, characterized in that the power setpoint (Psoll) is generated by a gas pedal (10) as modified by a drive resistance function generator (11) containing a substantially parabola-like characteristic curve (20).

6. An apparatus according to claim 5, characterized in that the transmission data storage means (12) contains a transmission data field (40) which represents the transmission ratio (i) as a function of the power setpoint (Psoll) and the output shaft speed (n$_G$) of a stepless transmisson according to i=f(Psoll, n$_G$) and is connected to the drive resistance function generator (11) and to a transmission output speed tacho-generator (18) and in that the output signal from the transmission data storage (12) determines the prevailing transmission ratio (i) of the stepless transmission (14).

7. An apparatus according to claim 5, characterized in that the transmission data storage means (12) contains a transmission data field (41) which represents the transmission ratio (i) as a function of the power setpoint (Psoll) and of the output shaft speed (n$_G$) of a discrete or stepped gear transmission according to i=f(Psoll, n$_G$) and is connected to the drive resistance function generator (11) and to a transmission output speed tacho-generator (18) and in that the output signal from the transmission data storage (12) determines the prevailing gear (i) of the discrete gear transmission (14) which is to be engaged.

8. An apparatus according to claim 7, characterized in that a multiplying circuit (134) is provided having inputs connected to the transmission output speed tacho-generator (18) and to the output of the transmission data storage (12) and in that a switch (133) is controllable by the transmission data storage (12), the switch (133) being capable of switching the engine speed inputs of the engine data storage (13) to the output of the multiplying circuit (134).

9. An apparatus according to claim 7, characterized in that a limiting circuit (140) is connected between the drive resistance function generator (11) and the transmission data storage (12) the limiting circuit (140) being connected to the transmission tacho-generator (18) and including circuit means for performing a double differentiation with respect to time of the transmission output shaft speed and in that the output signal of the limiting circuit (140) becomes limited when the magnitude of the second time derivative of the transmission output shaft speed signal exceeds a predeterminable value.

10. An apparatus according to claim 5, characterized in that a delay member 122 is connected between the drive resistance function generator (11) and the transmission data storage (12).

11. An apparatus according to claim 1, characterized in that the engine operation data storage means (13) comprises a first engine data storage section (13') which contains an engine data field (50; 52) representing: power (P) as a function of the engine speed n$_M$ and of the fuel input control according to the relationship P=f(n$_M$, α);

fuel input control position α as a function of the power (P) and of the engine speed (n$_M$), according to the relationship α=f(P, n$_M$);

the first section being connected to the drive resistance function generator (11) to receive a signal representative of commanded power and to an engine speed tacho-generator (17) to receive an engine speed signal n$_M$;

the first section having its output connected to determine and control the fuel input control α of the internal combustion engine (15).

12. An apparatus according to claim 1, characterized in that the data storage means (12,13) include digital memories (65), the data fields are quantized in raster form and in that the values corresponding to the various raster locations are placed in storage cells of the digital memory (65) at corresponding addresses.

13. An apparatus according to claim 12, characterized in that a characteristic data field (i; α) is interrogated by applying input variables (Psoll, n$_G$; Psoll, n$_M$) to respective analog-digital converters (60, (62) and thence to weighting circuits (61,63) which associate with each of the values of the input variables field values (FP, Fn$_G$; FP, Fn$_M$), said field values being summed in adders (64), the output signals from said adder (64) serving to address said digital memories (65).

14. An apparatus according to claim 13, characterized in that a further, gear-dependent field value (Fi) is applied to the adder (64) via a weighting circuit (68) for the purpose of interrogating the transmission data field (41) of the discrete gear transmission.

15. An apparatus according to claim 14, characterized in that the transmission data field (41) and the gear-dependent field values (Fi) are so selected that the resulting down-shift line (410, 411) of the prevailing gear substantially coincides with the characteristic power curve (501) in the engine data field (50) related to maximum throttle position (α) and in that the resulting up-shift line (410', 411') substantially coincides with a characteristic power curve (503) located somewhat, for example 15%, below the curve (51) for optimum fuel consumption.

16. An apparatus according to claim 1, characterized in that a second engine data storage (13") contains the characteristic engine data curve representing throttle valve position ($\alpha$) as a function of the engine speed ($n_M$) at optimum fuel consumption according to $\alpha = f(n_M)$, and wherein the second engine data storage (13") is connected to an engine tacho-generator (17) and in that the output signal of the second engine data storage (13") determines the fuel input position $\alpha$ of the internal combustion engine (15).

17. An apparatus according to claim 16, characterized in that the output signals from the engine data storages (13', 13") are applied to a switch (90) which is connected to actuate a control input of the internal combustion engine (15) and wherein the switch (90) is controllable by a program control unit (91).

18. An apparatus for controlling an engine/transmission unit or drive train of a motor vehicle, including an operating member for defining a power setpoint of the engine and at least one engine data storage containing characteristic power curves of said engine, the engine and the transmission being controlled by means of said at least one engine data storage in dependence on the power setpoint in such a manner that an optimum energy consumption of the engine is the result, comprising, according to the invention, a transmission data storage (12) containing a characteristic transmission data field including optimum transmission ratio i as a function of power setpoint $P_{soll}$ and of the vehicle velocity $v_F$ according to the relationship
$i = f(P_{soll}, v_F)$;
a first control loop connected to and controlling the transmission ratio i of the transmission of the drive train in accordance with the power setpoint $P_{soll}$ on the basis of data in the transmission data field to provide for optimum vehicle operation at the vehicle speed; and a second control loop which sets a fuel control position $\alpha$, which is related to engine operation in dependence on the engine speed, said second control loop including
a first engine data storage containing engine operating curves (13') which relate a fuel control position $\alpha$ as a function of the power setpoint $P_{soll}$ and of the engine speed $n_M$ according to the relationship
$\alpha = f(P_{soll}, n_M)$ to relate optimum power at the pertaining engine speed;
a second engine data storage (13") containing engine operating data curves which relate a fuel control position $\alpha$ as a function of the power setpoint $P_{soll}$ according to the relationship
$\alpha = f(P_{soll})$ and valid for optimum fuel consumption of the engine (15);
a transfer switch (90) connected to selectively receive the output signals from the engine data storage means (13', 13") connected to actuate the fuel control of the internal combustion engine (15);
a program control unit (91) to select the signal transfer position of the transfer switch (90) in accordance with a selected operating mode of the vehicle;
and wherein the control of the transmission ratio by said first loop for optimum operation of the drive train has priority over control by said second control loop.

19. An apparatus according to claim 18, characterized in that the program control unit (91) includes a third engine data storage (92) which contains a characteristic engine curve representing the engine speed $n_M$ as a function of the power setpoint $P_{soll}$ in accordance with the relationship
$n_M = f(P_{soll})$ and valid at optimum fuel consumption,
said third engine data storage (92) being connected to the output of the drive resistance function generator (11);
and further characterized in that the transfer switch (90) switches the fuel control input of the internal combustion engine (15) from the output of the first engine data storage (13') to the output of the second engine data storage (13") when the output signal of the engine tacho-generator (17) has attained a predetermined relationship to the output signal of the third engine data storage (92) to change over the fuel control from optimum power output of the engine to optimum fuel economy.

20. An apparatus according to one of the claim 18, characterized in that the program control unit (91) includes circuit means for recognizing the excursion speed ($\dot{\beta}$) of the gas pedal (10) and in that the switch (90) switches the fuel control of the internal combustion engine (15) from the output of the second engine data storage (13") to the output of the first engine data storage (13') when the magnitude of the excursion speed ($\dot{\beta}$) of the gas pedal (10) exceeds a predeterminable value.

21. An apparatus according to one of the claim 18, characterized in that the program control unit (91) includes a fourth engine data storage (110) which contains a data field representing (50) power (P) as a function of the throttle valve position ($\alpha$) and of the engine speed ($n_M$) according to $P = f(\alpha, n_M)$ and which is connected to the fuel control of the internal combustion engine (15) and also to the engine speed tacho-generator (17), and in that the transfer switch (90) switches the fuel control of the internal combustion engine (15) from the output of the second engine data storage (13") to the output of the first engine data storage (13') when the difference between the output signal of the drive resistance function generator (11) and the output signal of the fourth engine data storage (110) exceeds a predeterminable value.

22. An apparatus according to one of the claim 18, characterized in that the program control unit (9') includes a fourth engine data storage (110) which contains a data field (50) representing power (P) as a function of the throttle valve position ($\alpha$) and of the engine speed ($n_M$) according to $P = f(\alpha, n_M)$ and which is connected to the fuel control of the internal combustion engine (15) and also to the engine speed tacho-generator (17) and in that the transfer switch (90) switches the fuel control of the internal combustion engine (15) from the output of the second engine data storage (13") to the output of the first engine data storage (13') when the difference between the output signal of the drive resistance function generator and the output signal of the fourth engine data storage (110) has not decreased to zero after a predeterminable time interval ($\Delta t$).

* * * * *